United States Patent
Keller et al.

(10) Patent No.: US 8,152,305 B2
(45) Date of Patent: Apr. 10, 2012

(54) METHODS, SYSTEMS, AND COMPUTER PROGRAM PRODUCTS FOR FULL SPECTRUM PROJECTION

(75) Inventors: Kurtis P. Keller, Hillsborough, NC (US); Henry Fuchs, Chapel Hill, NC (US); Leonard McMillan, Chapel Hill, NC (US); Leandra Vicci, Siler City, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 778 days.

(21) Appl. No.: 11/632,151

(22) PCT Filed: Jul. 18, 2005

(86) PCT No.: PCT/US2005/025380
§ 371 (c)(1),
(2), (4) Date: Jun. 10, 2008

(87) PCT Pub. No.: WO2006/020187
PCT Pub. Date: Feb. 23, 2006

(65) Prior Publication Data
US 2009/0009723 A1 Jan. 8, 2009

Related U.S. Application Data

(60) Provisional application No. 60/588,656, filed on Jul. 16, 2004.

(51) Int. Cl.
*G03B 21/00* (2006.01)
*G02B 27/14* (2006.01)
*H04N 5/74* (2006.01)

(52) U.S. Cl. .................... 353/31; 359/634; 348/759

(58) Field of Classification Search ................. 348/743, 348/759; 359/1–35, 634; 353/99, 31
See application file for complete search history.

(56) References Cited

U.S. PATENT DOCUMENTS

| | | | |
|---|---|---|---|
| 2,166,750 | A | 7/1939 | Carter |
| 4,087,646 | A | 5/1978 | Brolin et al. |
| 4,373,163 | A | 2/1983 | Vandebult |
| 4,408,277 | A | 10/1983 | Cortellini et al. |
| 4,462,096 | A | 7/1984 | Kusaka |

(Continued)

FOREIGN PATENT DOCUMENTS

DE    37 04 180    7/1995

(Continued)

OTHER PUBLICATIONS

Notification of Transmittal of the International Search Report and the Written Opinion of the International Searching Authority, or the Declaration for International Application No. PCT/US05/25380 (Jul. 18, 2005).

(Continued)

*Primary Examiner* — Thanh X Luu
*Assistant Examiner* — Danell L Owens
(74) *Attorney, Agent, or Firm* — Jenkins, Wilson, Taylor & Hunt, P.A.

(57) ABSTRACT

A broadband electromagnetic wave beam is projected from a broadband wave source (301). The wave beam is separated by an element (306) into narrowband wavelength beams. The narrowband beams are directed across a predetermined area (312). A narrowband wavelength beam corresponding to a desired pixel wavelength is selected and displayed on a display surface (318).

52 Claims, 8 Drawing Sheets

U.S. PATENT DOCUMENTS

| | | |
|---|---|---|
| 4,757,434 A | 7/1988 | Kawabata et al. |
| 4,922,163 A | 5/1990 | McKee et al. |
| 4,922,261 A | 5/1990 | O'Farrell |
| 5,006,502 A | 4/1991 | Fujimura et al. |
| 5,061,941 A | 10/1991 | Lizzi et al. |
| 5,109,276 A | 4/1992 | Nudelman et al. |
| 5,110,727 A | 5/1992 | Oberhardt |
| 5,193,120 A | 3/1993 | Gamache et al. |
| 5,198,746 A | 3/1993 | Gyugyi et al. |
| 5,206,504 A | 4/1993 | Sridharan |
| 5,307,153 A | 4/1994 | Maruyama et al. |
| 5,323,002 A | 6/1994 | Sampsell et al. |
| 5,339,073 A | 8/1994 | Dodd et al. |
| 5,350,676 A | 9/1994 | Oberhardt et al. |
| 5,371,543 A | 12/1994 | Anderson |
| 5,410,370 A | 4/1995 | Janssen |
| 5,436,448 A | 7/1995 | Hosaka et al. |
| 5,446,798 A | 8/1995 | Morita et al. |
| 5,452,024 A | 9/1995 | Sampsell |
| 5,457,493 A | 10/1995 | Leddy et al. |
| 5,458,785 A | 10/1995 | Howe et al. |
| 5,459,451 A | 10/1995 | Crossfield et al. |
| 5,467,146 A | 11/1995 | Huang et al. |
| 5,483,058 A | 1/1996 | Leviton |
| 5,488,431 A | 1/1996 | Gove et al. |
| 5,489,952 A | 2/1996 | Gove et al. |
| 5,491,510 A | 2/1996 | Gove |
| 5,523,749 A | 6/1996 | Cole et al. |
| 5,526,051 A | 6/1996 | Gove et al. |
| 5,528,318 A | 6/1996 | Janssen |
| 5,532,997 A | 7/1996 | Pauli |
| 5,541,723 A | 7/1996 | Tanaka |
| 5,548,058 A | 8/1996 | Muroi et al. |
| 5,570,135 A | 10/1996 | Gove et al. |
| 5,583,850 A | 12/1996 | Snodgrass et al. |
| 5,608,468 A | 3/1997 | Gove et al. |
| 5,612,753 A | 3/1997 | Poradish et al. |
| 5,629,794 A | 5/1997 | Magel et al. |
| 5,630,027 A | 5/1997 | Venkateswar et al. |
| 5,638,303 A | 6/1997 | Edberg et al. |
| 5,658,677 A | 8/1997 | Ebisch et al. |
| 5,668,611 A | 9/1997 | Ernstoff et al. |
| 5,698,843 A | 12/1997 | Phak |
| 5,699,444 A | 12/1997 | Palm |
| 5,784,098 A | 7/1998 | Shoji et al. |
| 5,870,136 A | 2/1999 | Fuchs et al. |
| 5,903,323 A | 5/1999 | Ernstoff et al. |
| 5,914,692 A | 6/1999 | Bowers et al. |
| 5,946,178 A | 8/1999 | Bulenga |
| 5,976,369 A | 11/1999 | Howe et al. |
| 6,018,402 A | 1/2000 | Campbell et al. |
| 6,067,207 A | 5/2000 | Kurita |
| 6,156,416 A | 12/2000 | Daems et al. |
| 6,162,364 A | 12/2000 | Tillotson et al. |
| 6,166,706 A | 12/2000 | Gallagher et al. |
| 6,172,608 B1 | 1/2001 | Cole |
| 6,219,110 B1 | 4/2001 | Ishikawa et al. |
| 6,269,324 B1 | 7/2001 | Rakijas et al. |
| 6,330,824 B1 | 12/2001 | Erie et al. |
| 6,341,016 B1 | 1/2002 | Malione |
| 6,370,107 B1 | 4/2002 | Hosaka et al. |
| 6,412,429 B2 | 7/2002 | Foresman |
| 6,412,972 B1 | 7/2002 | Pujol et al. |
| 6,428,169 B1* | 8/2002 | Deter et al. .................. 353/20 |
| 6,442,416 B1 | 8/2002 | Schultz |
| 6,456,339 B1* | 9/2002 | Surati et al. .................. 348/745 |
| 6,457,833 B1 | 10/2002 | Ishikawa et al. |
| 6,470,226 B1 | 10/2002 | Olesen et al. |
| 6,493,149 B2* | 12/2002 | Ouchi ............................ 359/634 |
| 6,496,332 B1 | 12/2002 | Okazaki et al. |
| 6,503,195 B1 | 1/2003 | Keller et al. |
| 6,545,580 B2 | 4/2003 | Hegde et al. |
| 6,549,004 B1 | 4/2003 | Prigge |
| 6,554,434 B2 | 4/2003 | Sciammarella et al. |
| 6,588,944 B2 | 7/2003 | Harris |
| 6,596,076 B1 | 7/2003 | Wakayama |
| 6,609,798 B1 | 8/2003 | Milinusic et al. |
| 6,624,919 B2 | 9/2003 | Lambert |
| 6,636,275 B1 | 10/2003 | Wilson |
| 6,650,213 B1 | 11/2003 | Sakurai et al. |
| 6,716,642 B1 | 4/2004 | Wu et al. |
| 6,769,792 B1* | 8/2004 | Bornhorst ..................... 362/293 |
| 6,881,954 B1 | 4/2005 | Mormoto et al. |
| 6,885,266 B2 | 4/2005 | Ochi-Okorie |
| 6,960,984 B1 | 11/2005 | Vicci et al. |
| 7,119,645 B2 | 10/2006 | Vicci et al. |
| 7,182,465 B2 | 2/2007 | Fuchs et al. |
| 7,189,969 B2 | 3/2007 | Vicci et al. |
| 7,191,092 B2 | 3/2007 | Vicci et al. |
| 7,305,319 B2 | 12/2007 | Vicci et al. |
| 2001/0055462 A1 | 12/2001 | Seibel |
| 2002/0008812 A1* | 1/2002 | Conner et al. ................ 349/106 |
| 2002/0057832 A1 | 5/2002 | Proesmans et al. |
| 2002/0171809 A1 | 11/2002 | Kurtz et al. |
| 2002/0176149 A1 | 11/2002 | Davis et al. |
| 2003/0004985 A1 | 1/2003 | Kagimasa et al. |
| 2003/0013079 A1 | 1/2003 | Petropoulos |
| 2003/0024911 A1 | 2/2003 | Horsting et al. |
| 2003/0118222 A1 | 6/2003 | Foran et al. |
| 2003/0223083 A1 | 12/2003 | Geng |
| 2003/0227465 A1 | 12/2003 | Morgan et al. |
| 2004/0033060 A1 | 2/2004 | Beaton |
| 2004/0140981 A1* | 7/2004 | Clark ............................. 345/600 |
| 2004/0141213 A1* | 7/2004 | Kleiman ....................... 358/474 |
| 2004/0184013 A1 | 9/2004 | Raskar et al. |
| 2004/0191915 A1 | 9/2004 | Bawendi et al. |
| 2004/0241759 A1 | 12/2004 | Tozer et al. |
| 2004/0244470 A1 | 12/2004 | Vicci et al. |
| 2004/0257540 A1 | 12/2004 | Roy et al. |
| 2004/0262210 A1 | 12/2004 | Westervelt et al. |
| 2005/0015001 A1 | 1/2005 | Lee et al. |
| 2005/0064395 A1 | 3/2005 | Israel et al. |
| 2005/0231651 A1* | 10/2005 | Myers et al. .................. 348/744 |
| 2005/0276727 A1 | 12/2005 | Pawliszyn et al. |
| 2008/0261261 A1 | 10/2008 | Grimes et al. |
| 2010/0101308 A1 | 4/2010 | Superfine et al. |

FOREIGN PATENT DOCUMENTS

| | | |
|---|---|---|
| EP | 0 645 840 A1 | 3/1995 |
| EP | 0 693 733 A1 | 1/1996 |
| FR | 2794246 A1 | 12/2000 |
| NL | 9202158 | 7/1994 |
| WO | WO 92/17866 | 10/1992 |
| WO | WO 93/23909 | 11/1993 |
| WO | WO 97/01197 | 1/1997 |
| WO | WO 97/38404 | 10/1997 |
| WO | WO 99/60512 | 11/1999 |
| WO | WO 00/26989 | 5/2000 |
| WO | WO 03/029921 | 4/2003 |
| WO | WO 03/105289 A2 | 12/2003 |
| WO | WO 2005/082075 | 9/2005 |
| WO | WO 2008/103430 | 8/2008 |
| WO | WO 2008/139401 A2 | 11/2008 |

OTHER PUBLICATIONS

Notification Concerning Transmittal of International Preliminary Report on Patentability for International Application No. PCT/US2005/025380 (Jan. 25, 2007).

3rdTech, "HiBall™-3100 Wide-Area Tracker and 3D Digitizer," 3rd Tech, Inc. (2006).

Jian Ling, "Toward Raman Spectroscopy of Biological Tissue for Cancer Diagnosis", Southwest Research Institute IR&D, 10-9359 (Feb. 2003).

Welch et al., "High-Performance Wide-Area Optical Tracking—The HiBall Tracking System," Presence, vol. 10, No. 1, Massachusetts Institute of Technology (Feb. 2001).

Stavros Demos, "Endoscopic Subsurface Optical Imaging for Cancer Detection," Institute for Laser Science and Applications Report 2000.

Keller et al., "Real-time Structured Light Depth Extraction," Three Dimensional Image Capture and Applications III; SPIE Proceedings, p. 11-18; Photonics West—Electronic Imaging 2000 (Jan. 2000).

Welch et al., "The HiBall Tracker: High-Performance Wide-Area Tracking for Virtual and Augmented Environments," Symposium on Virtual Reality Software and Technology, University College London (Dec. 20-22, 1999).

Notification Concerning Transmittal of International Preliminary Report on Patentability for International Application No. PCT/US08/02331 (Sep. 3, 2009).
Notification of Transmittal of the International Search Report and the Written Opinion of the International Searching Authority, or the Declaration for International Application No. PCT/US08/02331 (Jun. 25, 2008).
Belmiloud et al., "Rheological Behavior Probed by Vibrating Microcantilevers," Applied Physicis Letters, vol. 92 (Jan. 30, 2008).
Sniadecki et al., "Magnetic Microposts as an Approach to Apply Forces to Living Cells," Proceedings of Natual Academy of Sciences, vol. 104, No. 37 (Sep. 11, 2007).
Notice of Allowance and Fee(s) Due for U.S. Appl. No. 10/487,860 (Jul. 25, 2007).
Evans et al., "Magnetically Actuated Nanorod Arrays as Biomin\metic Cilia," American Chemical Society, vol. 7, No. 5, pp. 1428-1434 (Apr. 10, 2007).
Official Action for U.S. Appl. No. 10/487,860 (Feb. 28, 2007).
Supplemental Notice of Allowability for U.S. Appl. No. 11/440,912 (Feb. 7, 2007).
Supplemental Notice of Allowability for U.S. Appl. No. 11/440,881 (Feb. 7, 2007).
Interview Summary for U.S. Appl. No. 10/487,860 (Jan. 22, 2007).
Supplemental Notice of Allowability for U.S. Appl. No. 11/066,629 (Oct. 10, 2006).
Notification Concerning Transmittal of International Preliminary Report on Patentability for International Application No. PCT/US2005/006225 (Sep. 28, 2006).
Supplemental Notice of Allowability for U.S. Appl. No. 10/786,427 (Aug. 17, 2006).
Notice of Allowance and Fee(s) Due for U.S. Appl. No. 11/066,629 (Aug. 9, 2006).
Notification of Transmittal of the International Search Report and the Written Opinion of the International Searching Authority, or the Declaration for International Application No. PCT/US2005/006225 (Aug. 2, 2006).
Notice of Allowance and Fee(s) Due for U.S. Appl. No. 11/440,912 (Jul. 25, 2006).
Notice of Allowance and Fee(s) Due for U.S. Appl. No. 11/440,881 (Jul. 25, 2006).
Final Official Action for U.S. Appl. No. 10/487,860 (Jul. 19, 2006).
Notice of Allowance and Fee(s) Due for U.S. Appl. No. 11/066,629 (Jun. 9, 2006).
Notice of Allowance and Fee(s) Due for U.S. Appl. No. 10/786,427 (Mar. 28, 2006).
Office Action in U.S. Appl. No. 10/487,860 (Dec. 7, 2005).
Restriction Requirement for U.S. Appl. No. 10/786,427 (Oct. 4, 2005).
Notice of Allowance and Fee(s) Due for U.S. Appl. No. 09/723,356 (May 10, 2005).
Official Action for U.S. Appl. No. 09/723,356 (Aug. 23, 2004).
Majumder et al., "Color Nonuniformity in Projection-Based Displays: Analysis and Solutions," IEEE Transactions on Visualization and Computer Graphics, vol. 10, No. 2, pp. 177-188 (Mar./Apr. 2004).
Notification of Transmittal of International Preliminary Examination Report for International Application No. PCT/US02/30853 (Mar. 4, 2004).
Notification of Transmittal of the International Search Report or the Declaration for International Application No. PCT/US02/30853 (May 7, 2003).
Prisco et al., "Point-of-Care Testing of Hemostasis in Cardiac Surgery," Thrombosis Journal, vol. 1, No. 1, 10 pgs. (May 2003).
Roth et al., "Wide Gamut, High Brightness Multiple Primaries Single Panel Projection Displays," SID Digest, ISSN/0003-0966X/03/3403-0694 (Copyright 2003).
Gross et al., "blue-c: A Spatially Immersive Display and 3D Video Portal for Telepresence," SIGGRAPH 2003 Conference Proceedings, ACM SIGGRAPH Annual Conference Series (2003).
Koninckx et al., "Real-Time Range Scanning of Deformable Surfaces by Adaptively Coded Structured Light," Fourth International Conference on 3-D Digital Imaging and Modeling (2003).

Raskar et al., "iLamps: Geometrically Aware and Self-Configuring Projectors," SIGGRAPH 2003 Conference Proceedings, ACM SIGGRAPH Annual Conference Series, pp. 1-10 (2003).
Zhang et al., "Spacetime Stereo: Shape Recovery for Dynamic Scenes," CVPR 2003 Conference Proceedings, CVPR Conference Series, pp. 1-8 (2003).
Wilde, "Three-Dimensional Force Microscope," (Downloaded from the Internet on Jun. 24, 2002).
"MFP-3D™ Atomic Force Microscope Power and Flexibility in One Complete System" Asylum Research, pp. 1-4 (Jun. 5, 2002).
Li et al., "Combining Stereo and Visual Hull Information for On-Line Reconstruction and Rendering of Dynamic Scenes," pp. 1-4 (2002).
Rusinkiewicz et al., "Real-Time 3D Model Acquisition," SIGGRAPH 2002 Conference Proceedings, ACM SIGGRAPH Annual Conference Series, pp. 1-9 (2002).
Zhang et al., "Rapid Shape Acquisition Using Color Structured Light and Multi-Pass Dynamic Programming," Proc. Symposium on 3D Data processing Visualization and Transmission (3DPVT), pp. 1-13 (2002).
Lee et al., "Microelectromagnets for the Control of Magnetic Nanoparticles," Applied Physics Letters, vol. 79, No. 20, pp. 3308-3310 (Nov. 12, 2001).
Vicci, "A 3D Magnetic Force Manipulator DC Prototype," Department of Computer Science, UNC Chapel Hill (Oct. 17, 2001).
Requicha et al., "Manipulation of Nanoscale Components with the AFM: Principles and Applications," Proceedings of the 2001 $1^{st}$ IEEE Conference on Nanotechnology, pp. 81-86 (Oct. 2001).
Baldis, "Institute for Laser Science and Applications," U.S. Department of Energy, UCRL-ID-145269 (Aug. 27, 2001).
Vicci, "A 3D Magnetic Force Manipulator DC Prototype," Department of Computer Science, UNC Chapel Hill (Jul. 3, 2001).
Heaton et al., "Scanning Probe/Atomic Force Microscopy: Technology Overview and Update," pp. 1-8 (Mar. 2001).
Notification of Transmittal of the International Search Report or the Declaration for International Application No. PCT/US00/33451 (Feb. 23, 2001).
Choi et al., "An On-Chip Magnetic Bead Separator Using Spiral Electromagnets with Semi-Encapsulated Permalloy," Biosensors & Bioelectronics 16, pp. 409-416 (2001).
Sadagic et al., "National Tele-Immersion Initiative: Towards Compelling Tele-Immersive Collaborative Environments," presentation given at Medicine meets Virtual Reality 2001 conference (2001).
"Atomic Force Microscopy," Veeco Metrology Group (Downloaded from the Internet on Jun. 24, 2002) (Copyright 2001).
Mulligan et al., "View-Independent Scene Acquisition for Tele-Presence," Proceedings of the International Symposium on Augmented Reality, pp. 1-10 (Oct. 2000).
Choi et al., "A New Magnetic Bead-Based, Filterless Bio-Separator with Planar Electromagnet Surfaces for Integrated Bio-Detection Systems," Sensors and Actuators B 68, pp. 34-39 (2000).
Matusik et al., "Image-Based Visual Hulls," Proceedings of SIGGRAPH 2000, pp. 1-6 (2000).
Perlin et al., "An Autostereoscopic Display," Proceedings of ACM SIGGRAPH 2000, Computer Graphics Proceedings, Annual Conference Series, pp. 1-8 (2000).
Ajito et al., "Six-Primary Color Projection Display for Expanded Color Gamut Reproduction," International Symposium on Multispectral Imaging and Color Reproduction for Digital Archives, Chiba, Japan, pp. 135-138 (1999).
Gibbs et al., "TELPORT—Towards Immersive Copresence," Multimedia Systems 7, pp. 214-221 (1999).
Advertisement, "Virtual 3D High Speed Non-Contact Surface Perception," Virtual 3-D Technologies Corporation, www.virtual3dtech.com (Dec. 21, 1998).
Ahn et al., "Micromachined Planar Inductors on Silicon Wafers for MEMS Applications," IEEE Transactions on Industrial Electronics, vol. 45, No. 6, pp. 866-876 (Dec. 1998).
Fuchs et al., "Augmented Reality Visualization for Laparoscopic Surgery," MICCAI< vol. 11, No. 13, pp. 934-943 (Oct. 1998).
Raskar et al., "The Office of the Future: A Unified Approach to Image-Based Modeling and Spatially Immersive Displays," Proceedings of SIGGRAPH 98, pp. 1-10 (Jul. 1998).

Drndić et al., "Micro-Electromagnets for Atom Manipulation," Applied Physics Letters, vol. 72, No. 22, pp. 2906-2908 (Jun. 1, 1998).

Advertisement, "Inspeck 3DC 3D CAPTUROR," www.inspeck.com (1998).

Advertisement, "Virtuoso," Visual Interface, Inc. (1998).

Livingston et al., "Magnetic Tracker Calibration for Improved Augmented Reality Registration," Presence: Teleoperators and Virtual Environments, MIT Press, vol. 6, No. 5, pp. 532-546 (Oct. 21, 1997).

Jacobs et al., "Managing Latency in Complex Augmented Reality Systems," Proceedings of 1997 Symposium on Interactive 3D Graphics, Annual Conference Series, ACM SIGGRAPH, pp. 49-54 (Apr. 27, 1997).

Agrawala et al., "The Two-User Responsive Workbench: Support for Collaboration Through Independent Views of a Shared Space," Proceedings of SIGGRAPH 97, Computer Graphics Proceedings, Annual Conference Series, pp. 327-332 (1997).

Welch et al., "SCAAT: Incremental Tracking with Incomplete Information," Computer Graphics 31, Annual Conference Series, pp. 1-12 (1997).

Zitnick et al., "Multi-Baseline Stereo Using Surface Extraction," Visual Interface Inc. (Nov. 24, 1996).

Garrett et al., "Real-Time Incremental Visualization of Dynamic Ultrasound vols. Using Parallel BSP Trees," Proceedings of IEEE Visualization of Dynamic Ultrasound Volumes Using Parallel BSP Trees, pp. 235-240 (Oct. 27, 1996).

Fuchs et al., "Towards Performing Ultrasound-Guided Needle Biopsies from Within a Head-Mounted Display," $4^{th}$ International Conference, VBC '96 (Sep. 22-25, 1996).

Ahn et al., "A Fully Integrated Micromachined Magnetic Particle Separator," Journal of Microelectromechanical Systems, vol. 5, No. 3, pp. 151-158 (Sep. 1996).

State et al., "Superior Augmented Reality Registration by Integrating Landmark Tracking and Magnetic Tracking," Computer Graphics Proceedings, Proceedings of SIGGRAPH 96—Annual Conference Series, pp. 429-438 (Aug. 4, 1996).

State et al., "Technologies for Augmented Reality Systems," Computer Graphics Proceedings, Proceedings of SIGGRAPH 96, Annual Conference Series, pp. 439-446 (Aug. 4, 1996).

DePiero et al., "3-D Computer Vision Using Structured Light: Design, Calibration and Implementation Issues," The University of Tennessee, pp. 1-46 (1996).

Hosaka et al., "Damping Characteristics of Beam-Shaped Micro-Oscillators," Elsevier Science Sensors and Actuators, vol. 49, pp. 87-95 (Feb. 1995).

Ahn at al., "A Fully Integrated Planar Toroidal Inductor with a Micromachined Nickel-Iron Magnetic Bar," IEEE Transactions on Components, Packaging, and Manufacturing Technology—Part A, vol. 17, No. 3, pp. 463-469 (Sep. 1994).

Laurentini, "The visual Hull Concept for Silhouette-based Image Understanding," IEEE Transactions on Pattern Analysis and Machine Intelligence, vol. 16, No. 2, pp. 150-162 (Feb. 1994).

State et al., "Case Study: Observing a Volume Rendered Fetus within a Pregnant Patient," IEEE Visualization Conference, $5^{th}$ ed., pp. 364-368 (1994).

Cruz-Neira et al., "Surround-Screen Projection-Based Virtual Reality: The Design and Implementation of the Cave," Proceedings of SIGGRAPH 93, pp. 135-142 (Aug. 1993).

Ohbuchi et al., "Incremental Volume Reconstruction and Rendering for 3D Ultrasound Imaging," Visualization in Biomedical computing, SPIE Proceedings, pp. 312-323 (Oct. 13, 1992).

Bajura et al., "Merging Virtual Objects with the Real World: Seeing Ultrasound Imagery within the Patient," Proceedings of SIGGRAPH 92, vol. 2, No. 26, pp. 203-210 (Jul. 20, 1992).

Ohbuchi et al., "Incremental Volume Rendering Algorithm for Interactive 3D Ultrasound Imaging," UNC-CH Computer Science Technical Report TR91-023 (1991).

Bitner et al., "Efficient Generation of the Binary Reflected Gray Code and Its Applications," Communications of the ACM, vol. 19, No. 9, pp. 517-521 (1976).

Baumgart, "Winged Edge Polyhedron Representation," Advanced Research Projects Agency, Computer Science Department, Stanford University, 48 pgs. (1972).

* cited by examiner

METHODS, SYSTEMS, AND COMPUTER PROGRAM PRODUCTS FOR FULL SPECTRUM PROJECTION

RELATED APPLICATIONS

This application claims the benefit of U.S. Provisional Patent Application Ser. No. 60/588,656, filed Jul. 16, 2004; the disclosure of which is incorporated herein by reference in its entirety.

TECHNICAL FIELD

The subject matter described herein relates to methods, systems, and computer program products for displaying color images. More particularly, the subject matter described herein relates to methods, systems, and computer program products for displaying color images using a full spectrum projector.

BACKGROUND ART

In some color display systems, light from a white light source is separated into red, green, and blue. To achieve a desired color, red, green, and blue are projected at different times in the same location during a frame display time. The human eye perceives the desired color that is a mixture of the red, green and blue. The intensities of red, green, and blue can be adjusted to produce different colors.

FIG. 1 is an optical schematic diagram of a conventional color display system. Referring to FIG. 1, a lamp 100 projects white light through collimating optics 102 to a color wheel 104. Color wheel 104 typically includes separate sectors of red, green, and blue. Color wheel 104 may also include a white light sector. Light exiting color wheel 104 passes through beam shaping optics 106 and impacts a digital micromirror device (DMD) 108. DMD 108 includes individually controllable mirrors that reflect beams of red, green, and blue light through a projection lens 110 and onto a display surface 112.

FIG. 2 is a flow chart illustrating exemplary steps for displaying color images using a conventional display device, such as that illustrated in FIG. 1. Referring to FIG. 2, in step 200, projector hardware grabs a frame and selects a pixel to be displayed. In step 202, the hardware determines a desired pixel color. In step 204, the projector hardware selects intensities of red, green, and blue to achieve the desired pixel color. For example, if it is desired to display a dark green pixel, the intensity of red may be low, the intensity of green may be high, and the intensity of blue may also be high. In step 206, the projector displays red, green, and blue during a frame display time for a pixel to achieve the desired color. Displaying red, green, and blue with the selected intensities will cause the viewer to perceive the pixel as being dark green.

One problem with existing color projectors is that such devices utilize only 55% of the available color space. Using only red, green, and blue prevents the generation of many colors, such as those outside of the color triangle. In addition, true Pantone colors cannot be produced using only red, green, and blue.

Another problem with existing red, green, and blue projectors is that they are incapable of reproducing individual wavelengths or frequencies. For example, the red, green, and blue filters used by conventional projectors have wideband color bandwidths of approximately 100 or greater nanometers. For example, a green filter in a conventional color wheel may pass light in the green wavelength ranging from about 450 nanometers to 600 nanometers. Such devices are incapable of producing colors that contain only discrete, narrowband wavelengths or frequencies.

Accordingly, in light of these difficulties associated with conventional color projectors, there exists a need for improved methods, systems, and computer program products for full spectrum projection.

DISCLOSURE OF THE INVENTION

According to one aspect, the subject matter described herein includes a method for full spectrum projection. The method includes projecting electromagnetic waves from a broadband electromagnetic wave source. The broadband electromagnetic waves are separated into narrowband-wavelength, spatially separate beams. The term "narrowband-wavelength," as used herein, refers to a bandwidth of no more than about 25 nanometers. The narrowband-wavelength beams are directed across a predetermined area. A narrowband-wavelength beam corresponding to a desired pixel wavelength is selected and displayed on a display surface.

According to another aspect, the subject matter described herein includes a system for full spectrum projection. The system includes a broadband electromagnetic wave source for projecting broadband electromagnetic waves. A separator separates the broadband electromagnetic waves into narrowband-wavelength beams. A beam director directs the narrowband-wavelength beams across a predetermined area. A beam selector selects an individual beam corresponding to a desired pixel color and directs the narrowband-wavelength beam to a display surface.

According to yet another aspect, the subject matter described herein includes a method for imperceptibly embedding structured light in a projected image using a full spectrum projector. The method includes determining a single or multiple narrowband colors to be displayed for a pixel in a color image. A value of a structured light pattern to be encoded for the pixel position is determined. A full spectrum projector is used to encode the desired value at the pixel position. The encoded value is detected using a wavelength selective detector.

The methods described herein for implementing full spectrum projection can be implemented using a computer program product comprising computer executable instructions embodied in a computer readable medium. Exemplary computer readable media suitable for implementing the subject matter described herein can include chip memory devices, disk memory devices, application specific integrated circuits, programmable logic devices, and downloadable electrical signals. In addition, a computer program product used for implementing the subject matter described herein can be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

According to one aspect, the subject matter described herein includes a system for full spectrum projection that selects individual wavelengths to display at pixel positions on a display surface. By individual wavelengths, it is meant that a full spectrum projection system according to the subject matter described herein is capable of displaying a narrowband-wavelength beam at each pixel in a projected image. For example, a full spectrum projector according to the subject matter described herein may be controlled to display a green pixel having a center wavelength of 577 nanometers and a bandwidth of no more than about 25 nanometers. Adjacent to the green pixel, a full spectrum projection system according to an embodiment of the subject matter described herein may display a blue pixel having an individual wavelength of 492 nanometers.

According to another aspect, a full spectrum projection system according to an embodiment of the subject matter described herein is preferably capable of displaying an entire range of visible light or other spectra, such as near infrared, infrared, or ultraviolet spectra. For example, a full spectrum projection system according to the subject matter described herein may be capable of displaying light in wavelengths ranging from at least about 390 nanometers in the violet range to 780 nanometers in the red range to over 1000 nanometers in the near infrared. Displaying a full spectrum of colors greatly enhances the quality of the projected image. In addition, because the subject matter described herein is capable of displaying individual wavelengths or frequencies for each pixel, the color quality of each pixel is further enhanced over conventional systems that rely on mixing red, green, and blue to achieve a desired color.

Figure 1:
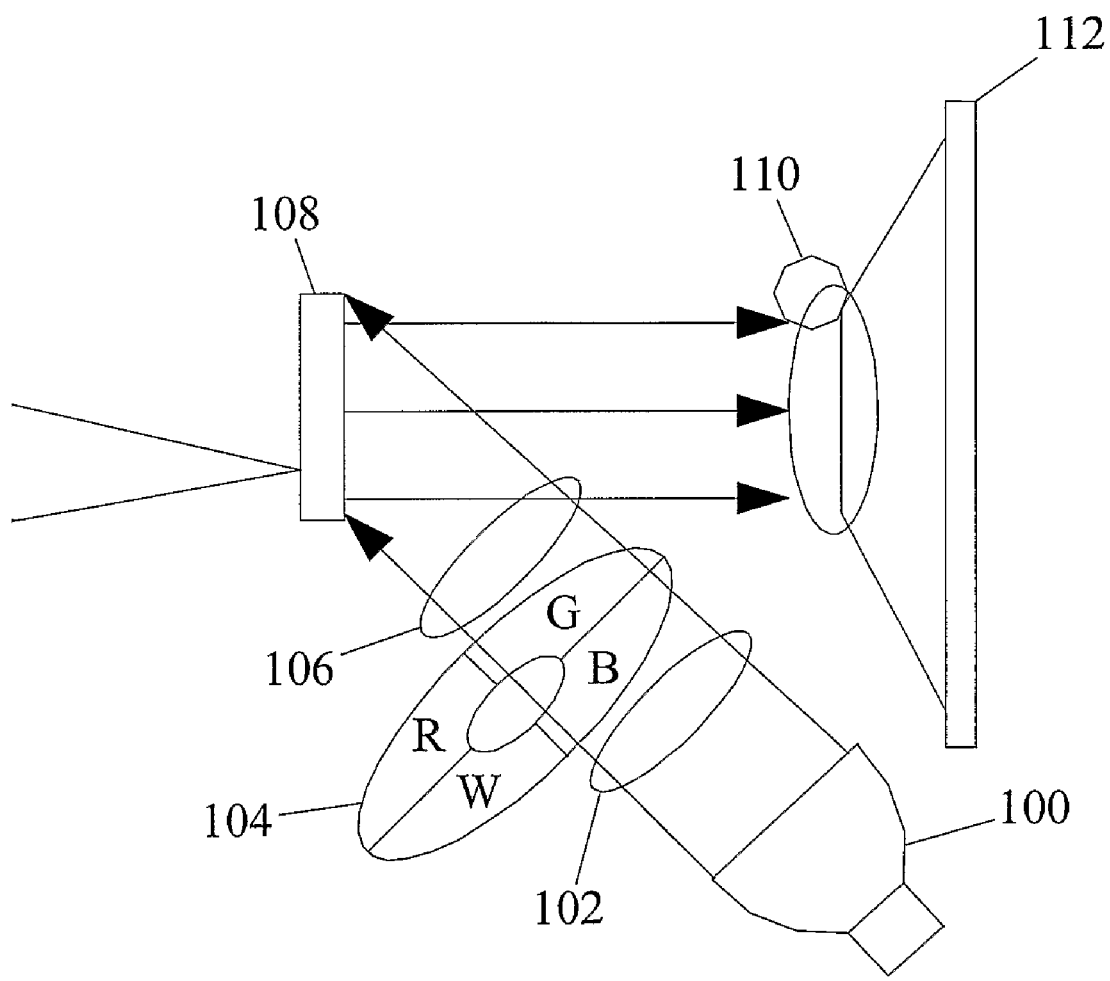
FIG. 1 is an optical schematic diagram of a conventional color projector.
Figure 2:
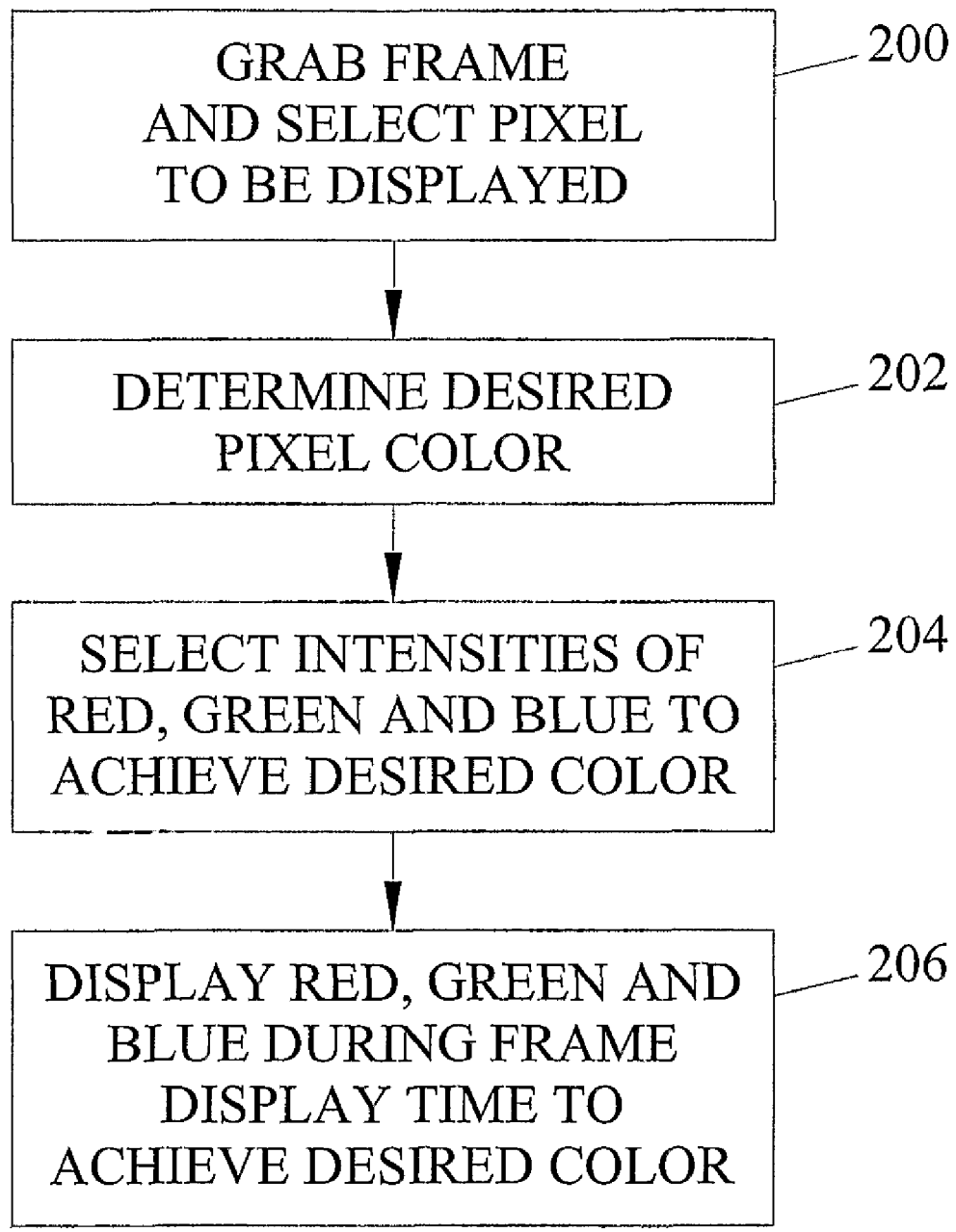
FIG. 2 is a flow chart illustrating exemplary steps performed by a conventional color projector in projecting color images.
Figure 3:
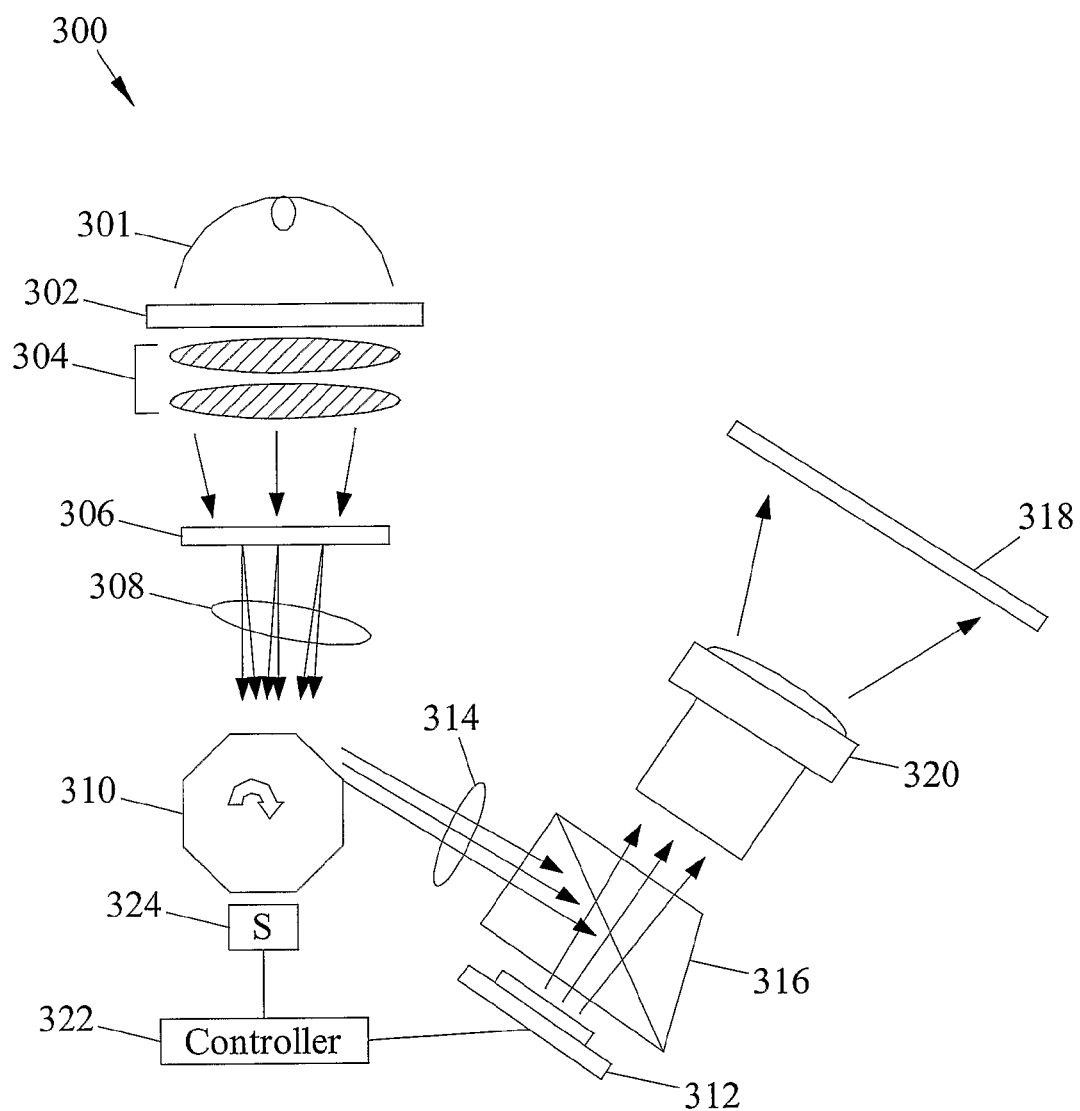
FIG. 3 is an optical schematic diagram of a system for full spectrum projection according to an embodiment of the subject matter described herein.

FIG. 3 is a block diagram illustrating a system for full spectrum projection according to an embodiment of the subject matter described herein. Referring to FIG. 3, the full spectrum projection system 300 includes a broadband electromagnetic wave source 301 for projecting broadband electromagnetic waves. If the full spectrum projection system is a visible light projection system, broadband electromagnetic wave source 301 may be a white light source capable of producing a collimated beam of white light. A filter 302 may be placed in front of broadband electromagnetic wave source 301 to filter wavelengths that are not of interest and to reduce thermal exposure of downstream optical components. In one exemplary implementation, filter 302 may comprise an infrared reflector or filter that removes infrared radiation from the beams emanating from broadband electromagnetic wave source. Collimating optics 304 may be placed downstream from filter 302 to collimate the broadband electromagnetic radiation emanating from broadband electromagnetic wave source 301.

A separator 306 separates the broadband electromagnetic beam into narrowband-wavelength, spatially separate beams. Separator 306 is a device capable of separating a broadband electromagnetic beam into multiple narrowband-wavelength beams. In one implementation, separator 306 may comprise a prism. In alternate implementations, separator 306 may comprise a diffraction grating, a variable dichroic filter, or a variable-color holographic filter. The narrowband wavelength beams may be separated from each other in space. That is, beams exiting separator 306 may appear as a rainbow where individual colors are separated from each other in space. Beam shaping optics 308 compress the narrowband-wavelength beams exiting from separator 306 into a desired area. Beam shaping optics may include any suitable beam shaping device, such as aspheric and holographic lenses.

A beam director 310 director the beams exiting from beam shaping optics 308 across a predetermined area. In one exemplary implementation, beam sweeper 310 may comprise a multifaceted mirror that rotates about an axis to sweep the beams across a desired area. In the example illustrated in FIG. 3, mirror 310 is shown from one side in the direction of the axis of rotation. When light emanating from beam shaping optics 308 impacts a face of beam director 310, the beams are swept sequentially in the direction corresponding to the arrows exiting beam director 310. In one implementation, beam director 310 may rotate through an arc such that each pixel is capable of seeing each color at least twice during each frame display time.

In an alternate implementation, beam director 310 may be configured to sequentially send narrowband-wavelength pulses of light across a predetermined area. For example, rather than sweeping the narrowband-wavelength beams across each pixel, beam director 310 may sequentially emit pulses of light corresponding to each color or wavelength so that the appropriate color or wavelength can be selected for each pixel.

A beam selector 312 selects individual beams exiting from beam director 310 corresponding to desired pixel colors. For example, as individual wavelength beams exit beam director 310, the individual wavelength beams pass through a focusing lens 314 and onto an internal face of total internal reflection optic 316. The beams are reflected onto a surface of beam selector 312. As the entire spectrum of colors passes across individual locations of beam selector 312, beam selector 312 may direct a desired pixel wavelength to a display surface 318 via a projection lens 320. In one exemplary implementation, beam selector 312 may comprise a digital micromirror device (DMD). In another implementation, beam selector 312 may comprise a light transmissive liquid crystal display (LCD).

A controller 322 determines the desired pixel color to be displayed and controls beam selector 312 to select the desired pixel. A sensor 324 senses the position of beam director 310 so that controller 322 knows when a desired pixel color is present at a given position of beam selector 312. Thus, rather than mixing only red, green, and blue to achieve desired colors, the system illustrated in FIG. 3 can select individual wavelengths for each pixel in a projected image. In addition, wavelengths outside of red, green, and blue can be displayed, leading to better color projection. The system illustrated in FIG. 3 can also mix individual wavelength beams to achieve desired colors during a frame display time.

Figure 4:
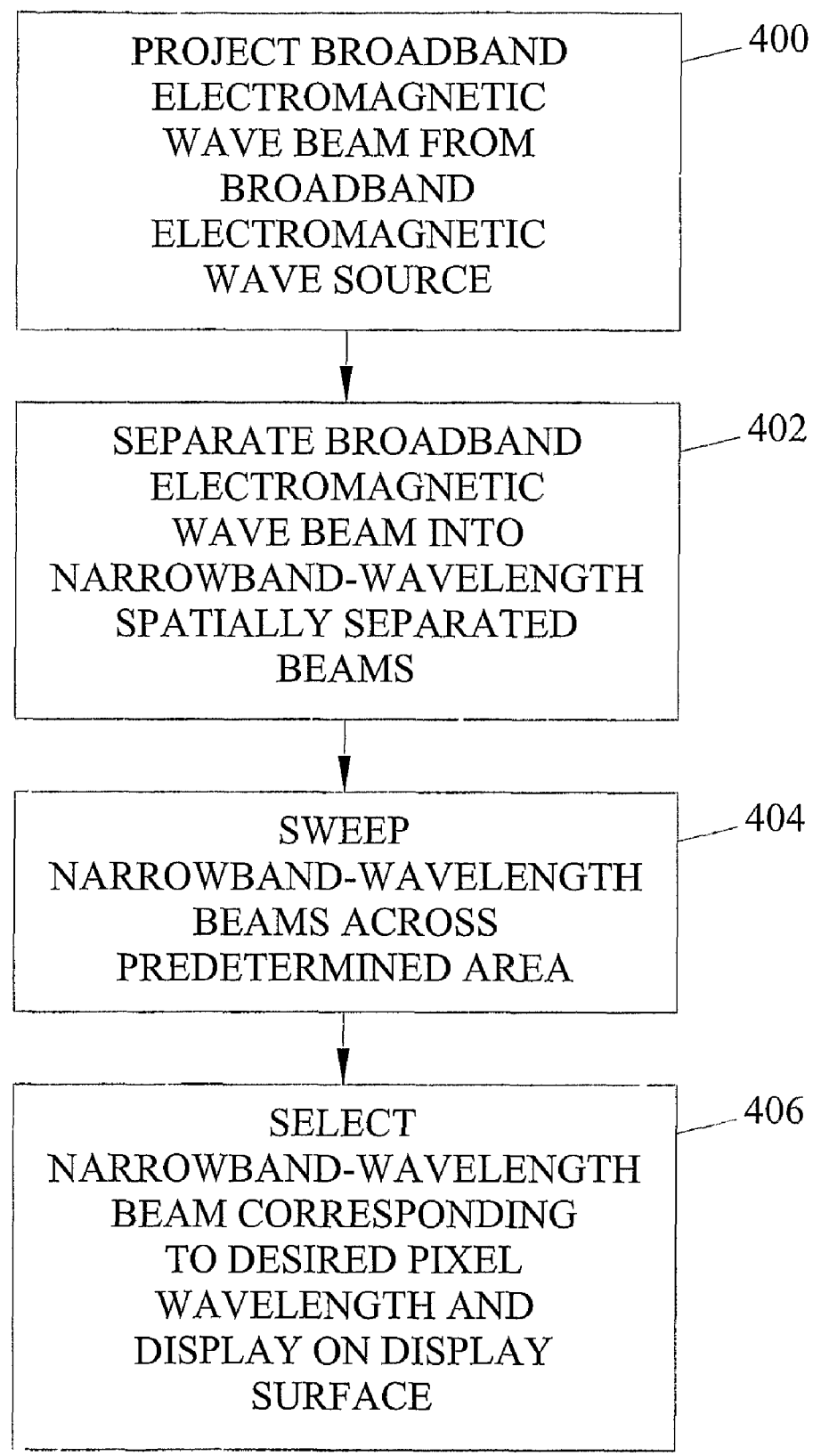
FIG. 4 is a flow chart illustrating exemplary steps for performing full spectrum projection according to an embodiment of the subject matter described herein.

FIG. 4 is a flow chart illustrating exemplary overall steps for full spectrum projection according to an embodiment of the subject matter described herein. Referring to FIG. 4, in step 400, broadband electromagnetic wave beams are projected from a broadband electromagnetic wave source. As stated above, the broadband electromagnetic wave source may be a white light source if it is desirable to project visible light. In an alternate implementation, the electromagnetic wave source may be a near infrared, infrared, or ultraviolet light source. In step 402, the broadband electromagnetic wave beam is separated into narrowband-wavelength, spatially separated beams. In step 404, the narrowband-wavelength beams are swept across a predetermined area. In step 406, a narrowband-wavelength beam corresponding to a desired pixel wavelength is selected and displayed on a display surface.

The color of each displayed pixel may be adjusted or varied by adjusting the intensity of the narrowband-wavelength beam corresponding to the pixel or by adjusting the intensities of narrowband-wavelength beams adjacent to or near the pixel whose color is being varied. When the intensities of adjacent pixels adjacent to an unaltered pixel are varied, a human observer will perceive that the color of the unaltered pixel has changed.

There are many applications for a full spectrum projection system according to an embodiment of the subject matter described herein. One application is imperceptibly embedding structured light patterns in projected color images for display on nonplanar and planar surfaces. For example, commonly assigned, co-pending U.S. patent application Ser. No. 11/066,629, filed on Feb. 25, 2005, the disclosure of which is incorporated herein by reference in its entirety, discloses methods, systems, and computer program products for imperceptibly embedding structured light patterns in projected color images for display on planar and nonplanar surfaces. One reason it is desirable to embed structured light patterns in projected color images is so that depth information can be gathered from the images so that the images can be predistorted for display on nonplanar surfaces. In the referenced patent application, DMD mirror flip sequences are analyzed to determine a binary image exposure period during which mirrors of a DMD device switch between on and off for a given pixel intensity being displayed so that structured light value can be embedded in a projected image without significantly altering the projected pixel color. A camera may be synchronized with the projector to acquire a structured light pattern during the binary image exposure period and detect the encoded value.

Figure 5:
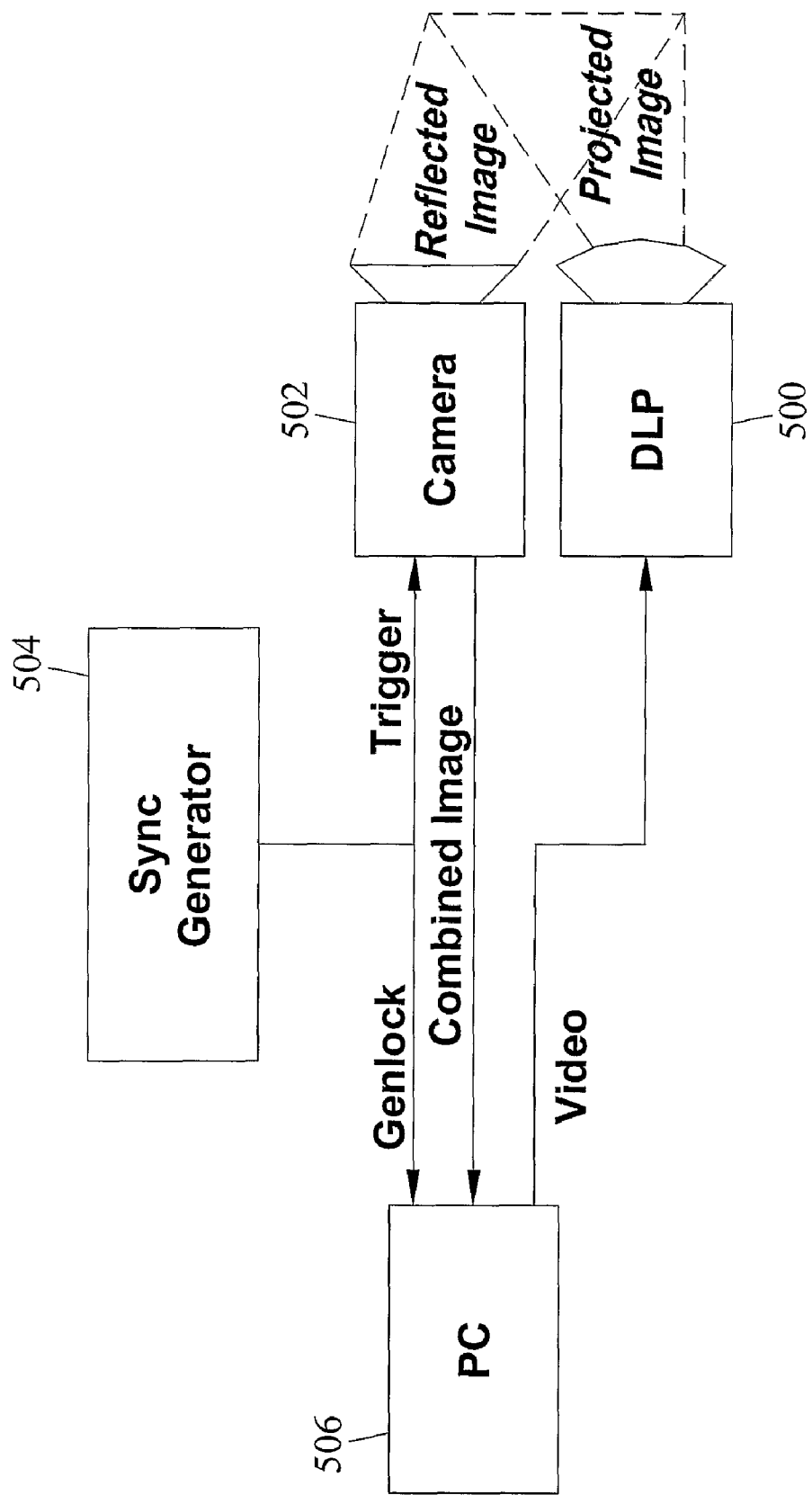
FIG. 5 is a block diagram illustrating exemplary components of an exemplary imperceptible structured light projection and detection system.

FIG. 5 is a block diagram illustrating one example of a structured light depth extraction system that requires synchronization between the projector and the camera. Referring to FIG. 5, a projector 500 projects structured light patterns onto a display surface. A camera 502 detects reflected images. The shutter of camera 502 is controlled by a trigger signal generated by sync generator 504. A computer 506 outputs a video signal with an embedded structured light image, detects the combined image, and extracts the structured light pattern. For example, if the input image had a red intensity of 129 for a given pixel, the color of the projected pixel may be adjusted to the closest value to 129 where the mirror corresponding to the pixel has the opposite polarity during the binary image exposure period. By synchronizing camera 502 to the binary image exposure period, the mirror polarity and hence the embedded structured light value can be detected.

Figure 6:
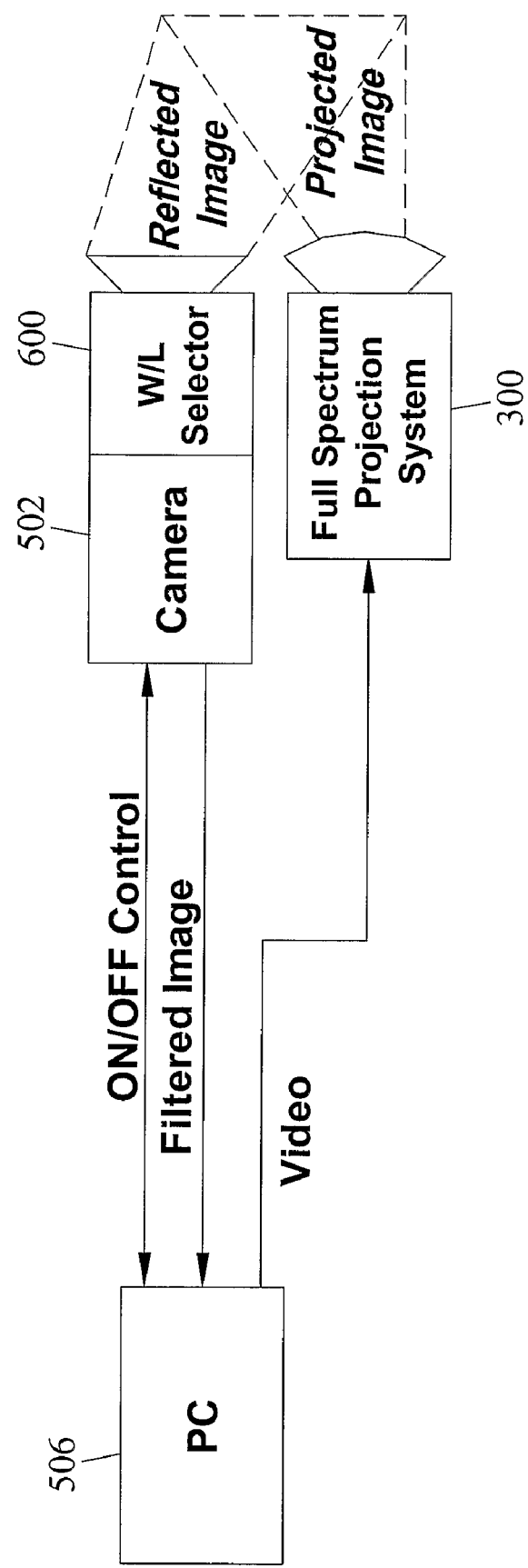
FIG. 6 is a block diagram illustrating an imperceptible structured light projection and detection system that uses a full spectrum projector according to an embodiment of the subject matter described herein.

While the system illustrated in FIG. 5 is suitable for its intended purposes, it requires synchronization between camera 502 and projector 500 so that camera 502 acquires an image during the binary image exposure period. It may be desirable to remove the synchronization requirement to further simplify the system. According to the subject matter described herein, full spectrum projection may be used to imperceptibly embed an individual wavelength pixel in a broadband projected image without requiring a binary image exposure period or synchronization between the projector and the camera. FIG. 6 illustrates a system for structured light depth extraction using a full spectrum projection system according to an embodiment of the subject matter described herein. Referring to FIG. 6, full spectrum projection system 300 may be used to project a color image with an embedded structured light pattern. Camera 502 may include a wavelength selector 600 for selecting individual wavelengths from a projected image. The wavelength selector may be any suitable filter capable of filtering an individual wavelength pixel. Camera 502 need not be synchronized with individual display periods of full spectrum projection system 300. Rather, camera 502 can simply continuously acquire the projected image and wavelength selector 600 will select the desired wavelength. Computer 506 controls the operation of camera 502 and outputs the video in which the structured light pattern is being encoded. It should be noted that sync generator 504 is not needed in the embodiment illustrated in FIG. 6.

Figure 7:
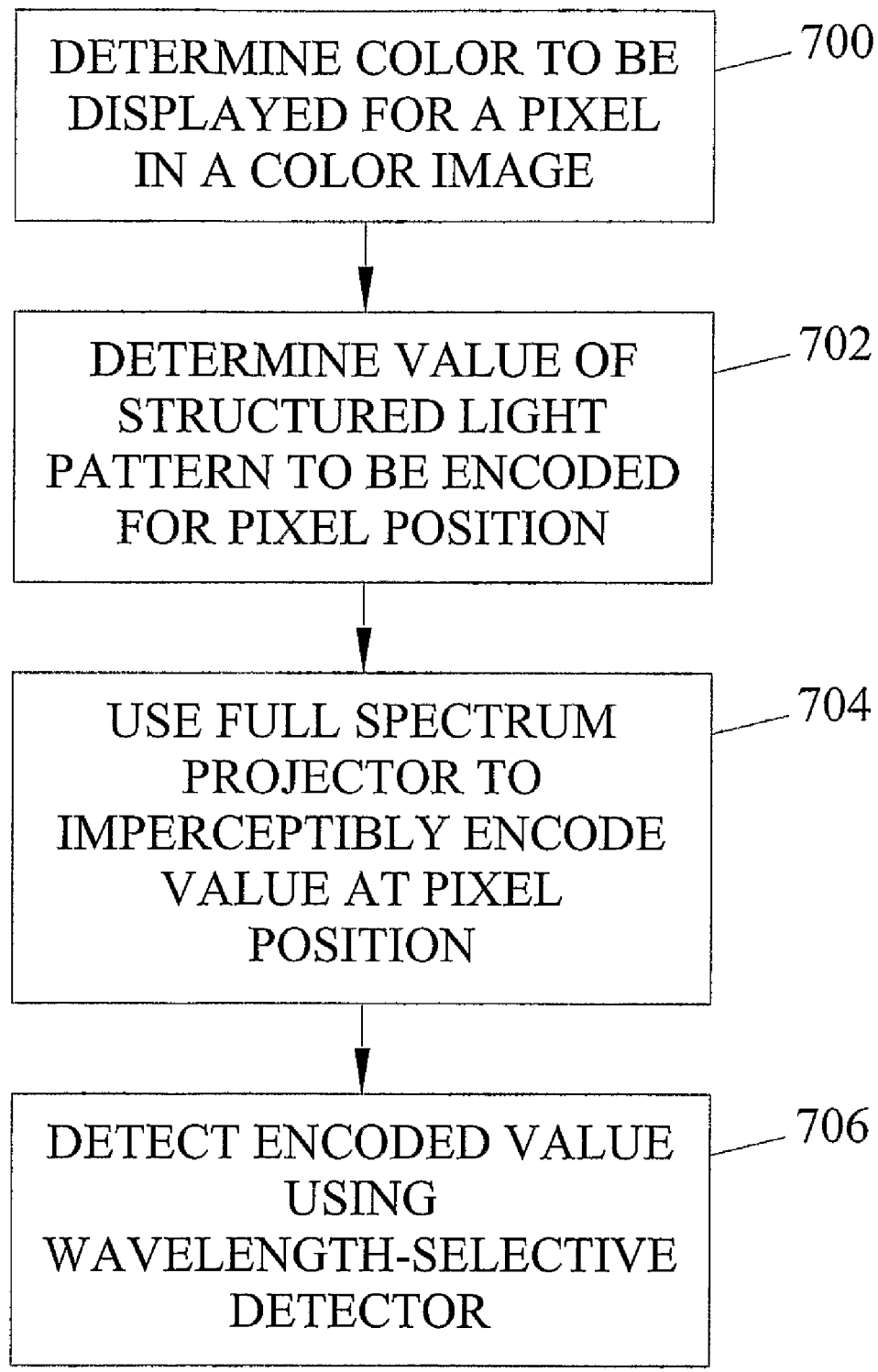
FIG. 7 is a flow chart illustrating exemplary steps for imperceptibly embedding a structured light pattern in a color image using a full spectrum projector according to an embodiment of the subject matter described herein.
Figure 8A:
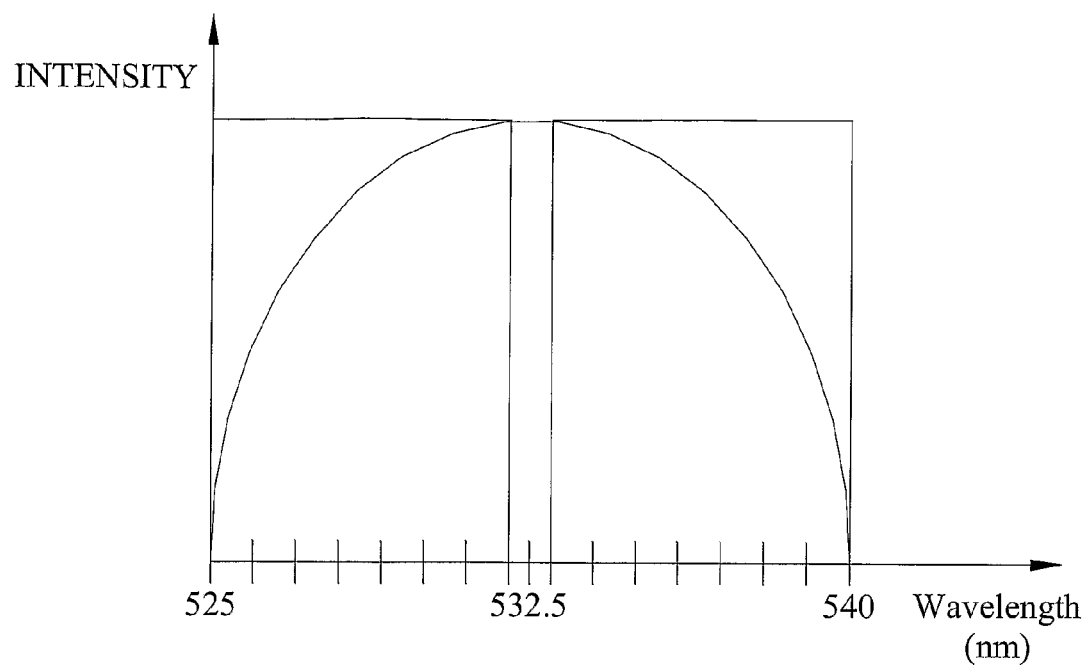
FIG. 8A is a graph illustrating one method for embedding a structured light value in a broadband projected color according to an embodiment of the subject matter described herein.

FIG. 7 is a flow chart illustrating exemplary overall steps for using full spectrum projection to imperceptibly embed a structured light pattern in a projected image according to an embodiment of the subject matter described herein. Referring to FIG. 7, in step 700, a color to be displayed for a pixel in a color image is determined. For example, it may be desirable to display the color green ranging from 525 to 540 nanometers. In step 702, the value of a structured light pattern to be encoded for a pixel is determined. For example, it may be desirable to encode a binary 1 or a binary 0 in a projected pixel. In step 704, a full spectrum projector is used to imperceptibly encode a value at a pixel position. Imperceptibly encoding the value at a pixel position may include displaying an individual wavelength beam at the pixel position so that the user would perceive a broadband color. FIG. 8A is a graph illustrating one method for encoding a structured light pattern in a broadband image. Referring to FIG. 8A, pixel values ranging from 525 to 540 nanometers may be displayed with the wavelength centered at 532.5 nanometers being turned off. The presence or absence of a 532.5 nanometer wavelength beam can be assumed to be a binary 0 or 1, corresponding to the structured light value being encoded. The curvilinear line in FIG. 8A represents the color as perceived by a human eye.

Figure 8B:
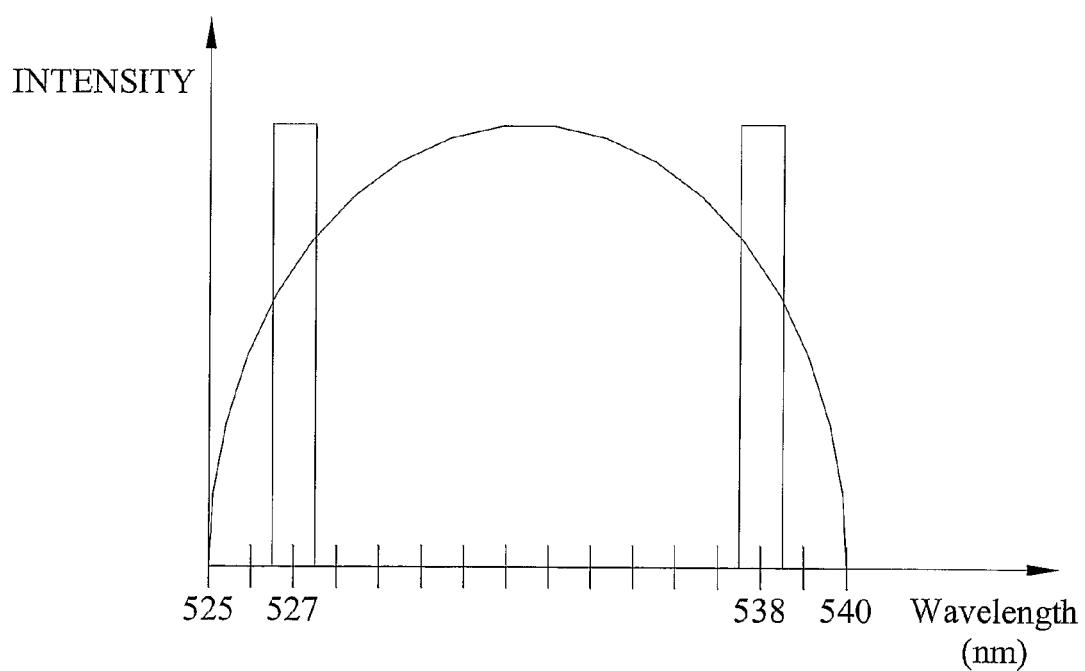
FIG. 8B is a graph illustrating an alternate method for embedding a structured light value in a broadband projected color according to an embodiment of the subject matter described herein.

FIG. 8B illustrates an alternate method for imperceptibly embedding a structured light pattern in a broadband pixel color. Referring to FIG. 8B, it may be desirable to display the color green ranging from 525 to 540 nanometers. In order to achieve a perceived display having this range of wavelengths, individual beams, having wavelengths of 527 and 538 nanometers may be projected. The resulting displayed image appears like a broadband image. However, a frequency sensitive detector may detect the individual wavelengths being projected.

Returning to FIG. 7, in step 706, the structured light pattern is detected using a wavelength selective detector. As described above with regard to FIG. 6, exemplary wavelength selective detectors that may be used include notch filters or any other suitable frequency selective detector. Thus, using the steps illustrated in FIG. 7, structured light images can be embedded in color images without requiring precise synchronization between the projector and the camera that acquires the images.

In addition to structured light depth extraction, the subject matter described herein may be used to produce narrowband-wavelength lighting, for example for the film and television industries. Narrowband-wavelength lighting may be desirable in environments in which precise control of color is used to achieve a desired effect, such as making all actors in a particular scene appear tan.

Another application of the subject matter described herein includes large projection displays, such as those used in outdoor amphitheaters or even in projection televisions.

Yet another application of the subject matter described herein includes calibrating infrared or other electromagnetic wave tracking equipment. For example, missile, jet, propeller plane, helicopter, and decoy exhaust systems each have characteristic thermal signatures. Some have higher peak temperatures, while others have high bulk energy at low temperatures. These variations are shown in a histogram of their frequency or temperature distributions in the visible, NIR, and IR spectra. To calibrate ground-based, ship, missile or aircraft tracking systems, simulating these various objects in a controlled environment economically and safely is difficult. However, with a full spectrum projection system described herein, one can project and tailor each pixel or area to correspond to the visible, NIR and IR signature of the simulated object. These "objects" can then be projected individually or in multiples accurately to allow the calibration item (heat seeking missile, etc.) to view the projected items at known locations and tracks and be accurately calibrated.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for full spectrum projection comprising:
   (a) projecting a broadband electromagnetic wave beam from a broadband electromagnetic wave source;
   (b) separating the broadband electromagnetic wave beam into a plurality of four or more spatially separate narrowband-wavelength beams, wherein each of the plurality of beams has a bandwidth on the order of no more than about twenty-five nanometers;
   (c) directing the narrowband-wavelength beams across a predetermined area;
   (d) selecting, from among the plurality of beams, a first narrowband-wavelength beam corresponding to a first desired pixel wavelength and a second narrowband-wavelength beam corresponding to a second desired pixel wavelength;
   (e) displaying the first narrowband-wavelength beam at a first pixel on a display surface during a first frame; and
   (f) displaying the second narrowband-wavelength beam at the first pixel on the display surface during the first frame.

2. The method of claim 1 wherein projecting a broadband electromagnetic wave beam includes projecting a white light beam.

3. The method of claim 2 wherein separating the broadband electromagnetic wave beam includes separating the broadband electromagnetic beam into narrowband-wavelength beams having wavelengths ranging from about 390 nanometers to about 780 nanometers.

4. The method of claim 1 wherein projecting a broadband electromagnetic wave beam includes projecting a beam having at least one of near infrared, infrared, and ultraviolet wavelengths.

5. The method of claim 1 wherein separating the broadband electromagnetic wave beam into narrowband-wavelength beams includes passing the broadband electromagnetic wave beam through a prism.

6. The method of claim 1 wherein separating the broadband electromagnetic wave beam into narrowband-wavelength beams includes passing, the broadband electromagnetic wave beam through a variable dichroic filter.

7. The method of claim 1 wherein separating the broadband electromagnetic wave beam into narrowband-wavelength beams includes passing the broadband electromagnetic wave beam through a diffraction grating.

8. The method of claim 1 wherein separating the broadband electromagnetic wave beam into narrowband-wavelength beams includes passing the broadband electromagnetic wave beam through a variable color holographic filter.

9. The method of claim 1 wherein directing the narrowband-wavelength beams across a predetermined area includes sweeping the narrowband-wavelength beams across a digital micromirror device using a multifaceted, rotating mirror.

10. The method of claim 1 wherein directing the narrowband-wavelength beams across a predetermined area includes individually pulsing the narrowband-wavelength beams onto the surface of a digital micromirror device (DMD).

11. The method of claim 1 wherein directing the narrowband wavelength beams across a predetermined area includes directing the narrowband wavelength beams across the surface of a digital micromirror device (DMD) so that each pixel sees at least one visible light spectrum of colors during a frame display time and wherein selecting the first narrowband wavelength beam corresponding to the first desired pixel color includes reflecting the first narrowband-wavelength beam corresponding to the first desired pixel color in response to the first narrowband-wavelength beam impacting a mirror of the digital micromirror device (DMD).

12. The method of claim 1 wherein selecting the first narrowband-wavelength beam includes selecting a narrowband-wavelength beam using a digital micromirror (DMD) device.

13. The method of claim 1 wherein selecting the first narrowband-wavelength beam includes selecting a narrowband-wavelength beam using a light transmissive liquid crystal display (LCD).

14. The method of claim 1 comprising repeating steps (a)-(f) to produce a plurality of narrowband-wavelength beams on a computer graphic display surface.

15. The method of claim 1 comprising directing a plurality of narrowband-wavelength beams into a scene to achieve narrowband-wavelength lighting.

16. The method of claim 1 comprising projecting a plurality of narrowband-wavelength beams onto a projection display surface.

17. The method of claim 1 comprising projecting a plurality of narrowband-wavelength electromagnetic beams onto the display surface to simulate an object being tracked and using the projected beams to calibrate electromagnetic tracking equipment.

18. The method of claim 1 comprising varying a perceived color of the first pixel by adjusting the intensity of the first narrowband wavelength beam.

19. The method of claim 1 comprising varying a perceived color of the first pixel by adjusting the intensity of at least one narrowband-wavelength beam corresponding to at least one second pixel near the first pixel.

20. A method for imperceptibly embedding a structured light image in a projected color image using a full spectrum projector, the method comprising:
   (a) determining a color to be displayed for a pixel in a color image;
   (b) determining a value of a structured light pattern to be encoded for a pixel position;
   (c) using a full spectrum projector to imperceptibly encode the value at the pixel position, wherein the full spectrum projector includes: (1) a separator for separating a broadband electromagnetic wave beam into a plurality of four or more spatially separate narrowband-wavelength beams, each beam with a bandwidth on the order of no more than about twenty-five nanometers, and (2) a beam selector for selecting, from among the plurality of beams, a first narrowband-wavelength beam corresponding to a first desired pixel wavelength and a second narrowband-wavelength beam corresponding to a second desired pixel wavelength, directing the first narrowband-wavelength beam to the pixel position on a display surface during a first frame, and directing the second narrowband-wavelength beam to the pixel position on the display surface during the first frame; and
   (d) detecting the encoded value using a wavelength-selective detector.

21. A system for full spectrum projection comprising:
   (a) a broadband electromagnetic wave source for projecting a broadband electromagnetic wave beam;
   (b) a separator for separating the broadband electromagnetic wave beam into a plurality of four or more spatially separate narrowband-wavelength beams, wherein each of the plurality of beams has a bandwidth on the order of no more than about twenty-five nanometers;
   (c) a beam director for directing the narrowband-wavelength beams across a predetermined area; and
   a beam selector for selecting, from among the plurality of beams, a first narrowband-wavelength beam corresponding to a first desired pixel wavelength and a second narrowband-wavelength beam corresponding to a second desired pixel wavelength, directing the first narrowband-wavelength beam to a pixel position on a display surface during a first frame, and directing the second narrowband-wavelength beam to the pixel position on the display surface during the first frame.

22. The system of claim 21 wherein the projector comprises a visible light projector.

23. The system of claim 22 wherein the separator is adapted to separate visible light into narrowband-wavelength beams having wavelengths ranging from 390 nanometers to 780 nanometers.

24. The system of claim 21 wherein the projector is capable of projecting an electromagnetic wave beam having at least one of near infrared, infrared, and ultraviolet wavelength ranges.

25. The system of claim 21 wherein the separator comprises a prism.

26. The system of claim 21 wherein the separator comprises a variable dichroic filter.

27. The system of claim 21 wherein the separator comprises a diffraction grating.

28. The system of claim 21 wherein the separator comprises a variable color holographic filter.

29. The system of claim 21 wherein the beam director comprises a multifaceted mirror arranged to rotate about an axis.

30. The system of claim 21 wherein the beam director is arranged to emit individual pulses of narrowband light corresponding to the narrowband-wavelength beams.

31. The system of claim 21 wherein the beam selector comprises a digital micromirror device (DMD).

32. The system of claim 21 wherin the beam selector comprises a light transmissive liquid crystal display(LCD).

33. The system of claim 21 wherein the beam director and the beam selector are adapted to generate a plurality of individual wavelength pixels for a computer graphics application.

34. The system of claim 21 wherein the beam director and the beam selector are adapted to project a plurality of narrowband-wavelength beams into a scene for a customized lighting application.

35. The system of claim 21 wherein the beam director and the beam selector are adapted to project a plurality of narrowband-wavelength pixels into a predetermined area to simulate an object being tracked by an electromagnetic wave tracking application.

36. The system of claim 21 wherein the beam director and the beam selector are adapted to project a plurality of narrowband-wavelength beams onto a projection display surface.

37. A computer program product comprising computer executable instructions embodied in a computer readable medium for performing steps comprising:
   (a) projecting a broadband electromagnetic wave beam from a broadband electromagnetic wave source;
   (b) separating the broadband electromagnetic wave beam into a plurality of four or more spatially separate narrowband-wavelength beams, wherein each of the plurality of beams has a bandwidth on the order of no more than about twenty-five nanometers;
   (c) directing the narrowband-wavelength beams across a predetermined area;
   (d) selecting, from among the plurality of beams, a first narrowband-wavelength beam corresponding to a first desired pixel wavelength and a second narrowband-wavelengh beam corresponding to a second desired pixel wavelength;
   (e) displaying the first narrowband-wavelength beam at a first pixel on a display surface during a first frame; and
   (f) displaying the second narrowband-wavelength beam at the first pixel on the display surface during the first frame.

38. The computer program product of claim 37 wherein projecting a broadband electromagnetic wave beam includes projecting a white light beam.

39. The computer program product of claim 38 wherein separating the broadband electromagnetic wave beam includes separating the broadband electromagnetic beam into narrowband-wavelength beams having wavelengths ranging from about 390 nanometers to about 780 nanometers.

40. The computer program product of claim 37 wherein projecting a broadband electromagnetic wave beam includes projecting a beam having at least one of near infrared, infrared, and ultraviolet wavelengths.

41. The computer program product of claim 37 wherein separating the broadband electromagnetic wave beam into narrowband-wavelength beams includes passing the broadband electromagnetic wave beam through a prism.

42. The computer program product of claim 37 wherein separating the broadband electromagnetic wave beam into narrowband-wavelength beams includes passing the broadband electromagnetic wave beam through a variable dichroic filter.

43. The computer program product of claim 37 wherein separating the broadband electromagnetic wave beam into narrowband-wavelength beams includes passing the broadband electromagnetic wave beam through a diffraction grating.

44. The computer program product of claim 37 wherein separating the broadband electromagnetic wave beam into narrowband-wavelength beams includes passing the broadband electromagnetic wave beam through a variable color holographic filter.

45. The computer program product of claim 37 wherein directing the narrowband-wavelength beams across a predetermined area includes sweeping the narrowband-wavelength beams across the predetermined area using a multifaceted, rotating mirror.

46. The computer program product of claim 37 wherein selecting the first narrowband-wavelength beam includes selecting the first narrowband-wavelength beam using a digital micromirror device (DMD).

47. The computer program product of claim 37 wherein selecting the first narrowband-wavelength beam includes selecting the first narrowband-wavelength beam using a light transmissive liquid crystal display (LCD).

48. The computer program product of claim 37 comprising repeating steps (a)-(f) to produce a plurality of narrowband-wavelength beams on a computer graphic display surface.

49. The computer program product of claim 37 comprising directing a plurality of narrowband-wavelength beams into a scene to achieve narrowband-wavelength lighting.

50. The computer program product of claim 37 comprising directing a plurality of narrowband-wavelength beams into a predetermined area to simulate an object being tracked by an electromagnetic wave tracking application.

51. The computer program product of claim 37 comprising projecting a plurality of narrowband-wavelength beams onto a projection display surface.

52. A computer program product comprising computer executable instructions embodied in a computer readable medium for performing steps comprising:
   (a) determining a color to be display for a pixel in a color image;
   (b) determining a value of a structured light pattern to be encoded for a pixel position;
   (c) using a full spectrum projector to imperceptibly encode the value at the pixel position, wherein the full spectrum projector includes: (1) a separator for separating a broadband electromagnetic wave beam into a plurality of four or more spatially separate narrowband-wavelength beams, each beam with a bandwidth on the order of no more than about twenty-five nanometers, and (2) a beam selector for selecting, from among the plurality of beams, a first narrowband-wavelength beam corresponding to a first desired pixel wavelength and a second narrowband-wavelength beam corresponding to a second desired pixel wavelength, directing the first narrowband-wavelength beam to the pixel position on a display surface during a first frame, and directing the second narrowband-wavelength beam to the pixel position on the display surface during the first frame; and
   (d) detecting the encoded value using a wavelength-selective detector.

* * * * *